US007420906B2

United States Patent
Yang et al.

(10) Patent No.: US 7,420,906 B2
(45) Date of Patent: Sep. 2, 2008

(54) AUTOMATIC POWER CALIBRATION APPARATUS FOR OPTICAL RECORDING DEVICE AND AUTOMATIC POWER CALIBRATION METHOD THEREFOR

(75) Inventors: Sung-un Yang, Gyeonggi-do (KR); Sung-ro Go, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 574 days.

(21) Appl. No.: 10/652,491

(22) Filed: Sep. 2, 2003

(65) Prior Publication Data
US 2004/0047263 A1 Mar. 11, 2004

(30) Foreign Application Priority Data
Sep. 11, 2002 (KR) .................... 10-2002-0054944

(51) Int. Cl.
G11B 7/00 (2006.01)
(52) U.S. Cl. ............. 369/116; 369/47.51; 369/59.11; 369/53.26
(58) Field of Classification Search ............. 369/47.5, 369/47.51, 47.53, 59.11, 116, 53.26
See application file for complete search history.

(56) References Cited
U.S. PATENT DOCUMENTS 4,858,219 A * 8/1989 Yoshikawa .................. 369/116
5,040,163 A * 8/1991 Sasaki et al. ................. 369/116
6,631,110 B1 * 10/2003 Seo et al. .................... 369/59.12
7,065,114 B2 * 6/2006 Hishiyama ................. 372/38.04
2003/0099177 A1 * 5/2003 Wang et al. ............... 369/53.26

FOREIGN PATENT DOCUMENTS

EP 944186 A2 * 9/1999
EP 1039665 A2 * 9/2000

* cited by examiner

Primary Examiner—Joseph Feild
Assistant Examiner—Parul Gupta
(74) Attorney, Agent, or Firm—Staas & Halsey LLP

(57) ABSTRACT

An automatic power calibration apparatus for optical recording devices and a method therefore. The power calibration apparatus includes an optical emission unit, an optical emission unit driving unit which outputs a signal for driving the optical emission unit in response to two or more first channel signal values and/or two or more second channel signal values, an optical detection unit which detects two or more first output signal values and two or more second output signal values corresponding respectively to the first and second channel signals, a memory, a central processing unit which receives the first and second output signal values from the optical detection unit; and an automatic power control unit which adjusts the first channel signal value to maintain the first output signal value to be equivalent to a first reference signal, according to the first reference signal, which is a reference signal of the first channel signal input from the central processing unit, and the first output signal input from the optical detection unit, and outputting the adjusted first channel signal value to the optical emission unit driving unit. Use of the power calibration apparatus enables cost reduction, improvement in productivity, and upgrading of recording quality.

13 Claims, 8 Drawing Sheets

AUTOMATIC POWER CALIBRATION APPARATUS FOR OPTICAL RECORDING DEVICE AND AUTOMATIC POWER CALIBRATION METHOD THEREFOR

CROSS-REFERENCE TO RELATED APPLICATIONS

This application claims the benefit of Application No. 2002-54944, filed Sep. 11, 2002, in the Korean Intellectual Property Office, the disclosure of which is incorporated herein by reference.

BACKGROUND OF THE INVENTION

1. Field of the Invention

The present invention relates to automatic power calibration apparatuses for optical recording devices and automatic power calibration methods therefor. More specifically, the present invention is directed to an automatic power calibration apparatus for optical recording devices and an automatic power calibration method therefor, which can perform automatic power calibration in an optical recording device without requiring a measuring apparatus for measuring an output of an optical emission unit like a laser diode.

2. Description of the Related Art

In recording media such as compact disc-read (CD-R) and compact disc-read write (CR-RW), a power calibration technique for optical recording devices has normally been applied to properly determine the size of each of a plurality of channel signals, which are input to a driving circuit for driving an optical emission unit, e.g., a laser diode, included in the optical recording device, based on an output characteristic of the laser diode, such that the laser diode maintains a uniform output.

FIGS. 1A and 1B are diagrams illustrating output waveforms of a laser diode for recording data in recording media. FIG. 1A illustrates an output waveform of the laser diode for recording data in CD-R. A read channel, a write channel, and an overdrive channel are applied separately or all together to a laser diode driving circuit to produce the output waveform shown in FIG. 1A. In order to form a pit with a more ideal shape on a recording medium, overdrive power is applied to the recording medium together with normal writing power during an initial irradiation stage. Therefore, light having a greater power than the normal writing power is emitted to change the phase of a recording layer of the recording medium.

Data is recorded in the recording medium during a period of outputting a read power together with a base power. FIG. 1B illustrates an output waveform of the laser diode for recording data in CD-RW. A bias power channel, an erase power channel, and a peak power channel are applied separately or all together to the laser diode driving circuit to produce the output waveform shown in FIG. 1B. A bias power is not used for an output of the laser diode shown in FIG. 1B. Data is recorded in the recording medium during a period of outputting an erase power together with a peak power, while data is erased during a period of outputting only the erase power. A power calibration technique is applied to adjust channel signal values applied to the laser diode driving circuit and thus determine an input current of a laser diode, such that an overdrive ratio of FIG. 1A and an epsilon ($\epsilon$) of FIG. 1B are maintained to be uniform. The overdrive ratio is defined as an overdrive power/(read power+base power), and epsilon ($\epsilon$) is defined as an erase power/(erase power+peak power+bias power). In general, the value of the overdrive ratio ranges from 0.1 to 0.25, while the value of the epsilon ranges from 0.4 to 0.65.

In an example of a conventional power calibration technique, an optical power meter, which is an apparatus for measuring an output of a laser diode, is used. The optical power meter is capable of measuring an output of a laser diode while varying each of a plurality of channel signals input to a driving circuit for driving the laser diode and storing collected data in a memory, and thus determining the size of an applied signal for each channel based on the stored data.

However, the foregoing method may be costly since it needs an expensive apparatus such as the optical power meter. Also, an adjuster should vary each channel signal and check an output value of an optical power meter every time the channel signal is varied. As a result, the entire process is less efficient and the time required for data extraction is increased.

SUMMARY OF THE INVENTION

The present invention provides an automatic power calibration apparatus for optical recording devices and an automatic power calibration method therefor, which enables a reduction in process time without requiring high-priced measuring apparatuses.

In accordance with one aspect of the present invention, there is provided an automatic power calibration apparatus, comprising an optical emission unit, an optical emission unit driving unit which outputs a signal driving the optical emission unit in response to two or more first channel signal values and/or two or more second channel signal values, an optical detection unit which detects two or more first output signal values and two or more second output signal values corresponding respectively to the first and second channel signals, a memory, a central processing unit which receives the first and second output signal values from the optical detection unit and produces first and second reference signals. An automatic power control unit produces the first channel signal value from the first reference signal to maintain the first output signal at an appropriate level.

The central processing unit outputs the second channel signal (overdrive signal DA_LIN) to the optical emission unit driving unit to control the second output signal value and stores in the memory a pair of input/output values of the first reference signal value and the corresponding first output signal value as well as a pair of input/output values of the second channel signal value and the second output signal value. Thereafter, the central processing unit refers to the pairs of input/output values stored in the memory and determines the first reference signal value S1 and the second channel signal value S2, so as to record information on an inserted disc.

The automatic power calibration apparatus for an optical recording device further comprises a database unit storing data including a ratio of the second output signal value to the first output signal value, which varies from disc type to disc type, and an optimum first output signal value.

The central processing unit determines a ratio R of the second output signal value to the first output signal value for a particular type of inserted disc by referring to the database unit, determines an optimum value T1 of the first output signal value for the particular disc type, determines a linear function F1 reflecting a relation between the first reference signal value and the first output signal value based on the pairs of input/output values of the first reference signal value and the first output signal value stored in the memory. The linear function F1 is used to determine the first reference signal value S1 corresponding to the optimum value T1 of the first output signal. The central processing unit also determines the second output signal value T2 based on the optimum value T1 of the first output signal and the ratio R, and determines a linear function F2 reflecting a relation between the second channel signal value and the second output signal value based on the pairs of input/output values of the second channel signal value and the second output signal value stored in the memory to determine the second channel signal value S2 corresponding to the second output signal value T2.

In accordance with another aspect of the present invention, there is provided an automatic power calibration method, comprising (a) obtaining two or more pairs of first reference signal values, or values of reference signals of first channel signals, which are input to an optical emission unit driving unit and drive an optical emission unit, and first output signal values obtained by measuring outputs of the optical emission unit resulting from the first channel signal values, using an optical detection unit, (b) obtaining two or more pairs of second channel signal values, which are input to the optical emission unit driving unit and drives the optical emission unit, and second output signal values obtained by measuring outputs of the optical emission unit resulting from the second channel signal values, using the optical detection unit, (c) storing the pairs of signal values obtained in operations (a) and (b), (d) referring to the pairs of signal values stored in operation (c) to determine the first reference signal value S1 and the second channel signal value S2, such that information is recorded in a disc inserted in an optical recording device, and (e) inputting in the optical emission unit driving unit the first channel signal value according to the first reference signal value S1, and the second channel signal value S2, which are determined in operation (d), to drive the optical emission unit.

Operation (d) comprises: (d1) determining a ratio R of the second output signal value to the first output signal value, for a particular disc type, (d2) determining an optimum value T1 of the first output signal, for the particular disc type, (d3) determining a linear function F1 reflecting a relation between the first reference signal value and the first output signal value, based on input/output signals obtained in operation (a) and stored in operation (c), to determine the first reference signal value S1 corresponding to the optimum value T1 of the first output signal according to the linear function F1, (d4) determining the second output signal value T2 according to the optimum value T1 of the first output signal and the ratio R, and (d5) determining a linear function F2 reflecting a relation between the second channel signal value and the second output signal value, based on the signal values obtained in operation (b) and stored in operation (c), to determine the second channel signal value S2 corresponding to the second output signal value T2.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of preferred embodiments, taken in conjunction with the accompanying drawings of which.

DETAILED DESCRIPTION OF THE PREFERRED EMBODIMENTS

Figure 1A:
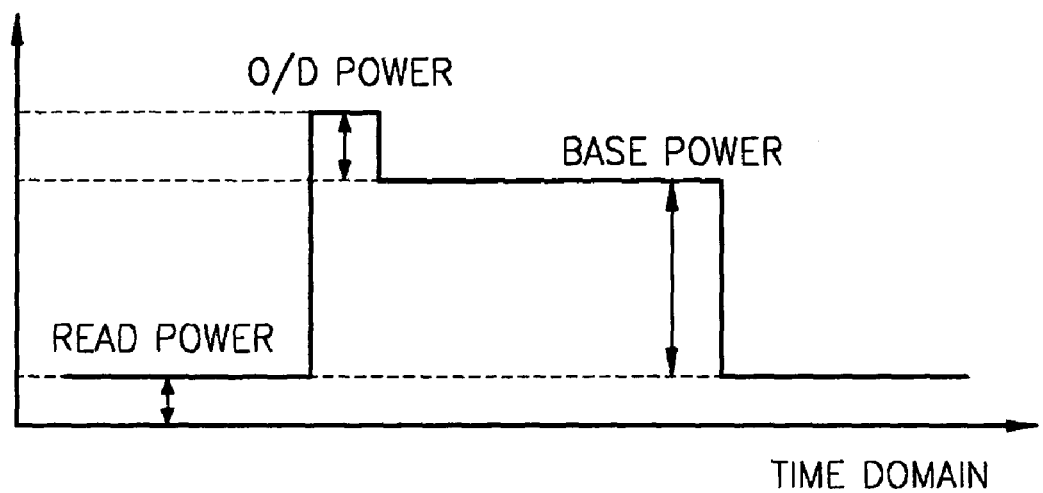
FIGS. 1A and 1B are diagrams illustrating output waveforms of an optical emission unit for recording data.
Figure 1B:
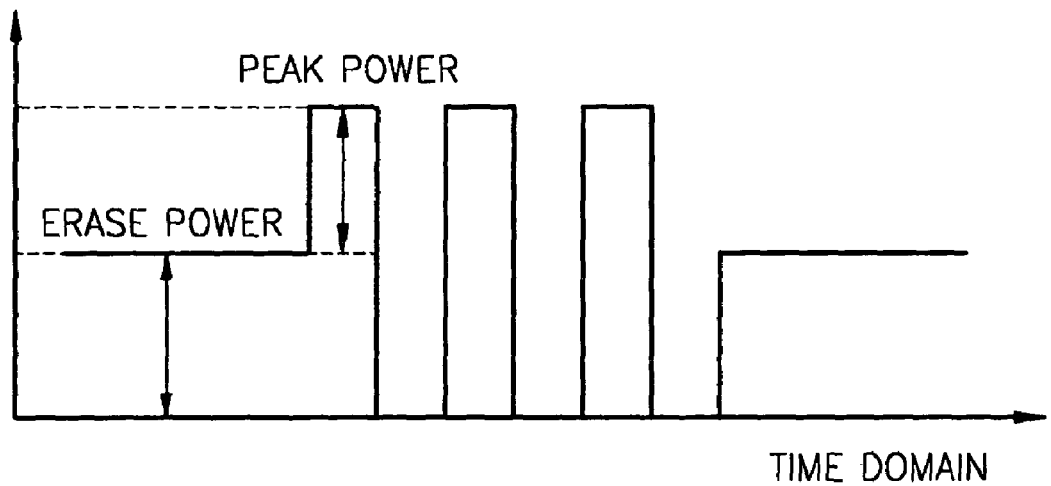

The structure and operation of embodiments of an automatic power calibration apparatus for optical recording devices according to the present invention and an automatic power calibration method according to the present invention for each embodiment of the automatic power calibration apparatus will be described with reference to the appended drawings. Like reference numerals refer to like elements throughout the description and the drawings.

Figure 2:
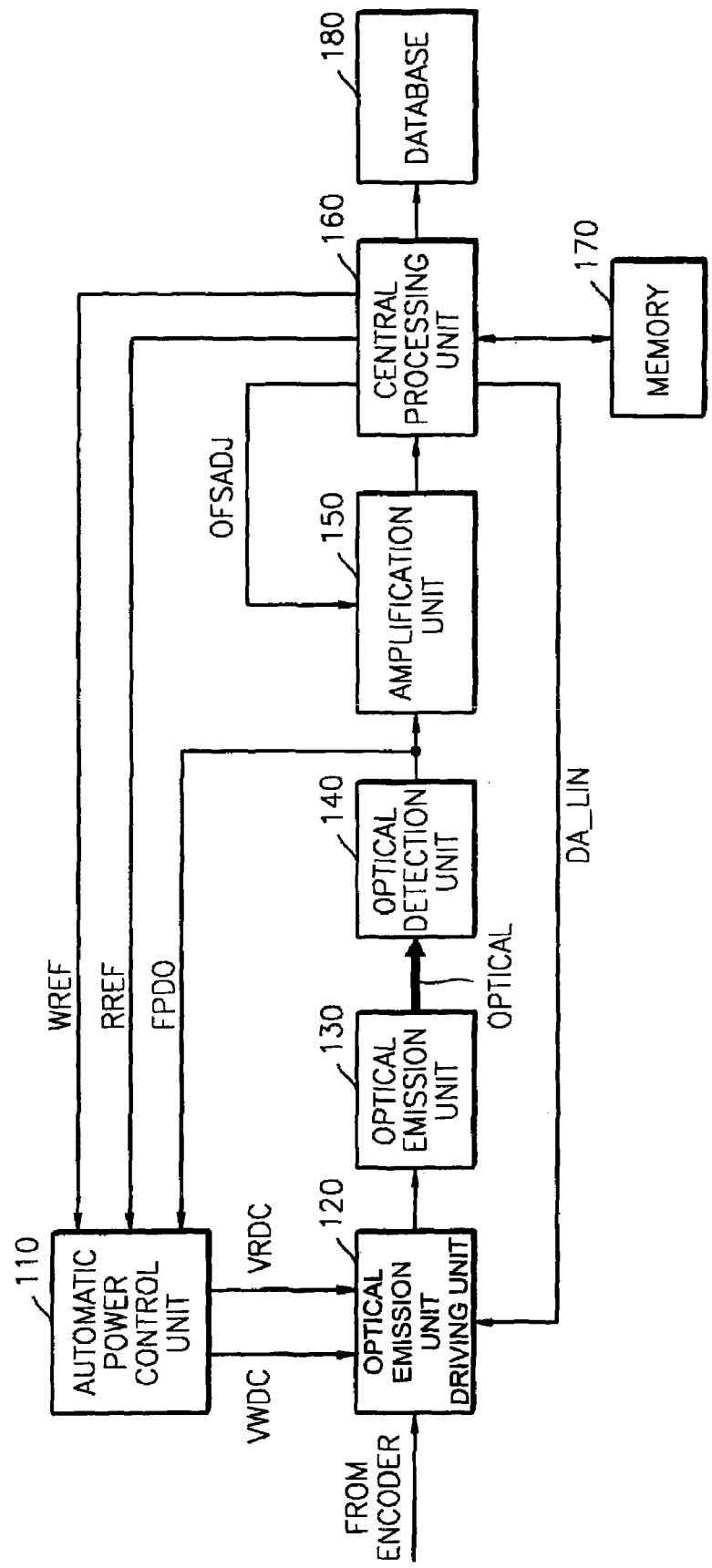
FIG. 2 is a block diagram illustrating an embodiment of an automatic power calibration apparatus according to the present invention.

FIG. 2 is a block diagram illustrating an embodiment of an automatic power calibration apparatus according to the present invention. Referring to FIG. 2, the automatic power calibration apparatus includes an automatic power control unit 110, an optical emission unit driving unit 120, an optical emission unit 130, an optical detection unit 140, an amplification unit 150, a central processing unit 160, a memory 170, and a database 180. The automatic power calibration apparatus shown in FIG. 2 is applied to an optical recording device recording information in CD-R by using an overdrive channel, a base channel, and a read channel.

Figure 3:
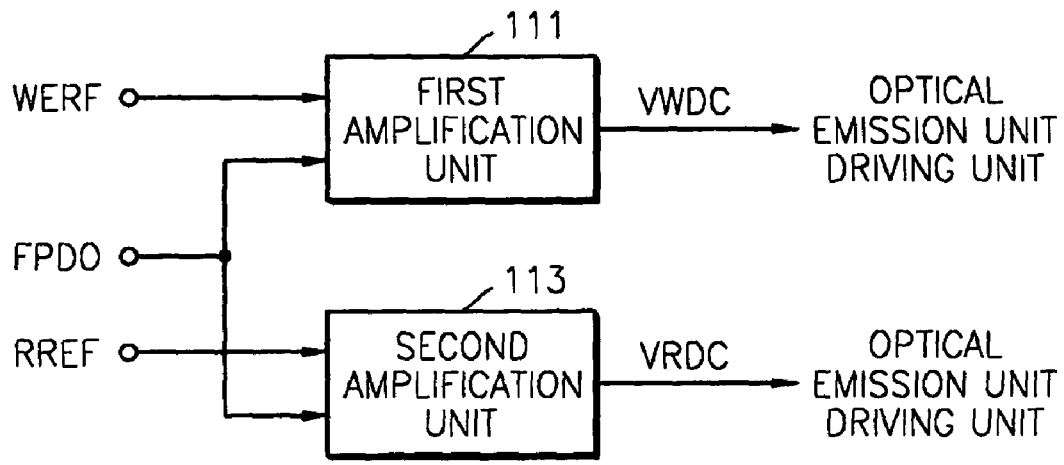
FIG. 3 is a block diagram illustrating a detailed configuration of an automatic power control unit illustrated in FIG. 2.

The automatic power control unit 110 receives reference signals WREF and RREF from the central processing unit 160, and an output signal FPDO fed back from the optical detection unit 140, and compares each reference signal with the output signal FPDO of the optical detection unit 140, and outputs channel signals VWDC and VRDC for maintaining an output of the optical emission unit 130 corresponding to each reference signal. FIG. 3 is a block diagram illustrating a detailed configuration of the automatic power control unit 110 illustrated in FIG. 2. Referring to FIG. 3, the automatic power control unit 110 includes a first amplification unit 111 and a second amplification unit 113. The first amplification unit 111 receives the reference signal WREF of a base power channel signal and the output signal FPDO of the optical detecting unit 140 from the central processing unit 160 and outputs a channel signal VWDC for maintaining an output of the optical detection unit 140. The second amplification unit 113 receives the reference signal RREF of a read power channel signal from the central processing unit 160 and the output signal FPDO of the optical detection unit 140 and outputs a channel signal VRDC for maintaining an output of the optical emission unit 130.

The optical emission unit driving unit 120 (also referred to as the optical emission driver) receives the channel signals VWDC and VRDC and also receives an overdrive power channel signal DA_LIN directly from the central processing unit 160. Accordingly, the channel signals VWDC and VRDC become signals generated via a closed loop, while the other channel signal DA_LIN is directly applied from the central processing unit 160 and generated via an open loop. The optical emission unit driving unit 120 receives these channel signals, receives on/off signals of each channel signal from an encoder (not shown), and outputs a driving signal, which is obtained by adding together currents corresponding to respective channel signals. The driving signal is inputted to the optical emission unit 130, the optical emission unit thereby producing an output waveform of a laser diode as shown in FIG. 1A.

The read power channel signal VRDC is applied to the optical emission unit driving unit 120 along with a write power channel signal VWDC and an overdrive power channel signal DA_LIN.

If the VRDC signal is applied to the optical emission unit driving unit 120, the optical emission unit 130 emits light having a rad power shown in FIG. 1A. If the VWDC signal is applied to the optical emission unit driving unit 120, the optical emission unit 130 emits light having a base power shown in FIG. 1A. If the DA_LIN signal is applied to the optical emission unit driving unit 120, the optical emission unit 130 emits light having an overdrive power shown in FIG. 1A.

If the VRDC signal and the VWDC signal are both applied to the optical emission unit driving unit 120, the optical emission unit 130 emits light having a combined power of the read power and the base power, that is, a normal writing power. While light having the writing power is irradiated into a recording medium, pits are formed on the recording medium. During an initial irradiation stage, light having an overdrive power combined with the writing power (read power+base power) is irradiated into the recording medium.

Figure 4:
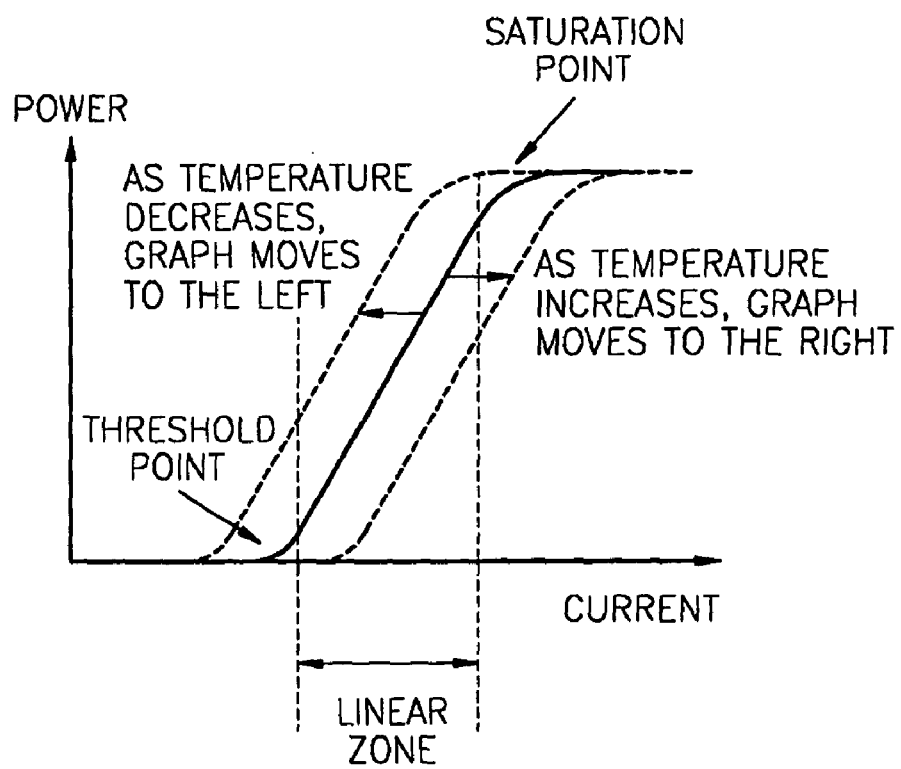
FIG. 4 is a graph illustrating an output characteristic of an optical emission unit illustrated in FIG. 2.

The optical emission unit 130 receives the driving signal from the optical emission unit driving unit 120 and outputs a light corresponding to the driving signal. A laser diode is a specific example of the optical emission unit 130, however, other types of optical components that produce a laser beam may be employed by the optical emission unit 130. FIG. 4 is a graph illustrating an output characteristic of the optical emission unit 130. The x-axis corresponds to the input current to the optical emission unit 130, and the y-axis corresponds to the strength of an output light. A relation between the input current and the strength of the output light exhibits a linear function over a certain period. The strength of the output light of the optical emission unit 130 varies with a change in temperature. That is, as temperature increases, the graph moves to the right. The input of the optical emission unit 130 is controlled such that the optical emission unit 130 operates within the linear zone. The power of light emitted from the optical emission unit 130 is determined by the strength of the output current applied to the optical emission unit 130.

Figure 5:
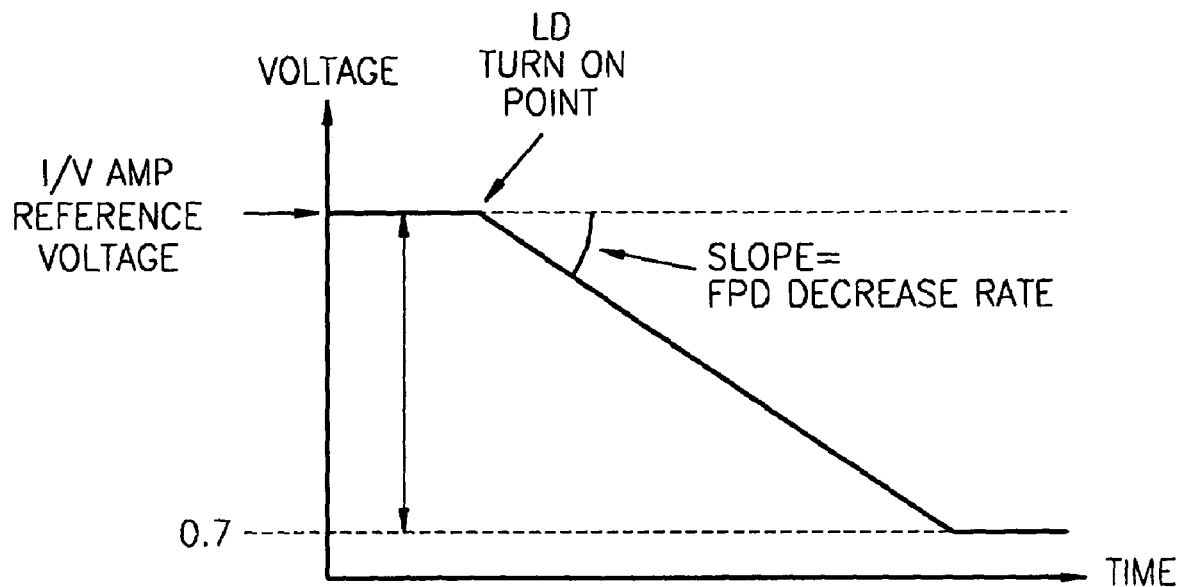
FIG. 5 is another graph illustrating an output characteristic of the optical emission unit illustrated in FIG. 2.

The optical detection unit 140 detects the strength of the light emitted from the optical emission unit 130, produces a current corresponding to the strength of the light, and converts the current into a voltage by an I/V amplifier (not shown). FIG. 5 is a graph illustrating an output characteristic of the optical detection unit 140. After the I/V amplifier (not shown) converts the current to the voltage, the voltage is inversely proportional to the strength of the light. That is, as the voltage increases, the corresponding strength of the light decreases. A certain period where the graph exhibits a linear variation is referred to as a dynamic period.

The amplification unit 150 amplifies the output signal FPDO of the optical detection unit 140 and outputs the amplified signal to the central processing unit 160. The amplification unit 150 may suffer from a calculation error caused by an offset generation due to the physical characteristics of a circuit. To remove such an offset, the central processing unit 160 outputs an offset adjusting signal OFSADJ having a predetermined value as a bias signal to one input terminal of the amplification unit 150. A value obtained by measuring the output of the amplification unit 150 is set to an offset in a state where the OFSADJ signal is already applied. Then, the central processing unit 160 subtracts the offset from the output FPDO of the optical detection unit 140 to be measured hereinafter. Thus, the offset between the output value of the optical detection unit 140 and the input value of the central processing unit 160 is removed.

The central processing unit 160 outputs the reference signals WREF and RREF to the automatic power control unit 110, outputs the overdrive power channel signal DA_LIN directly to the optical emission unit driving unit 120, and outputs the offset adjusting signal OFSADJ to the amplification unit 150. The central processing unit 160 receives the output signal FPDO of the optical detection unit 140 from the amplification unit 150, reads out an automatic power calibration module stored in the memory 170, and then performs predetermined calculation and control operations. The operations of the central processing unit 160 will be described in detail later.

The memory 170 stores and outputs the automatic power calibration module under the control of the central processing unit 160. Alternatively, the memory 170 receives data to be stored and then outputs the data for the calculation operation of the central processing unit 160. The memory 170 may be a non-volatile memory that adopts a data storage device such as an EEPROM.

The database 180 stores data including an overdrive ratio, which varies from disc type to disc type, as well as an optimum value of the base power output signal and provides the data to the central processing unit 160 under the control of the central processing unit 160.

Hereinafter, operations of determining base data for power calibration will be described in detail with reference to FIGS. 6A through 6D.

Figure 6A:
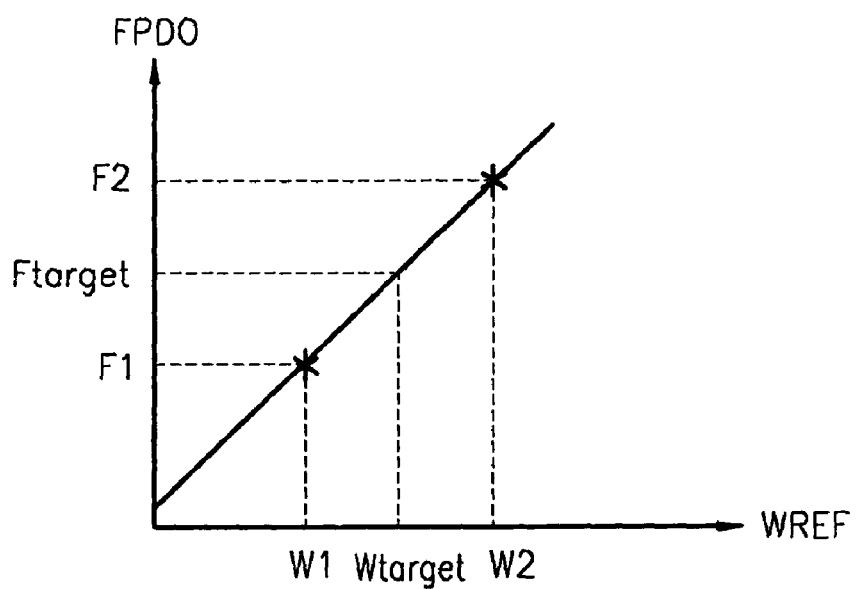
FIGS. 6A through 6D are graphs illustrating determining basic data in power calibration.

FIG. 6A is a graph illustrating a relation between the base power reference signal WREF input to the automatic power control unit 110 and the output signal FPDO of the optical detection unit 140. Since channel signals other than the reference signal WREF are not applied, the optical emission unit 130 outputs only base power and the optical detection unit 140 detects the base power. The central processing unit 160 outputs predetermined WREF values W1 and W2, receives FPDO values F1 and F2 corresponding respectively to the WREF values W1 and W2, and stores two pairs of input/output values (W1, F1) and (W2, F2) in the memory 170. In the range where a relation between WREF and FPDO satisfies a linear function, the graph of the linear function shown in FIG. 6A may be obtained by the two pairs of input/output values. Accordingly, it is possible to determine a WREF value Wtarget corresponding to any particular FPDO value Ftarget by using the function based on the value Ftarget. The desired FPDO value is determined based on a corresponding output of the laser diode. In this case, since a difference between the desired FPDO value and the corresponding output of the laser diode is pre-measured, the central processing unit 160 calculates a particular FPDO value from the difference. Meanwhile, to determine an accurate linear function between WREF and FPDO, more pairs of input/output values may be obtained. In FIG. 6A, only two pairs of data are measured to find one function. But, it is also possible to measure, for example, four pairs of data such that the four pairs of data divide the graph into three ranges and a function is found for each range.

Figure 6B:
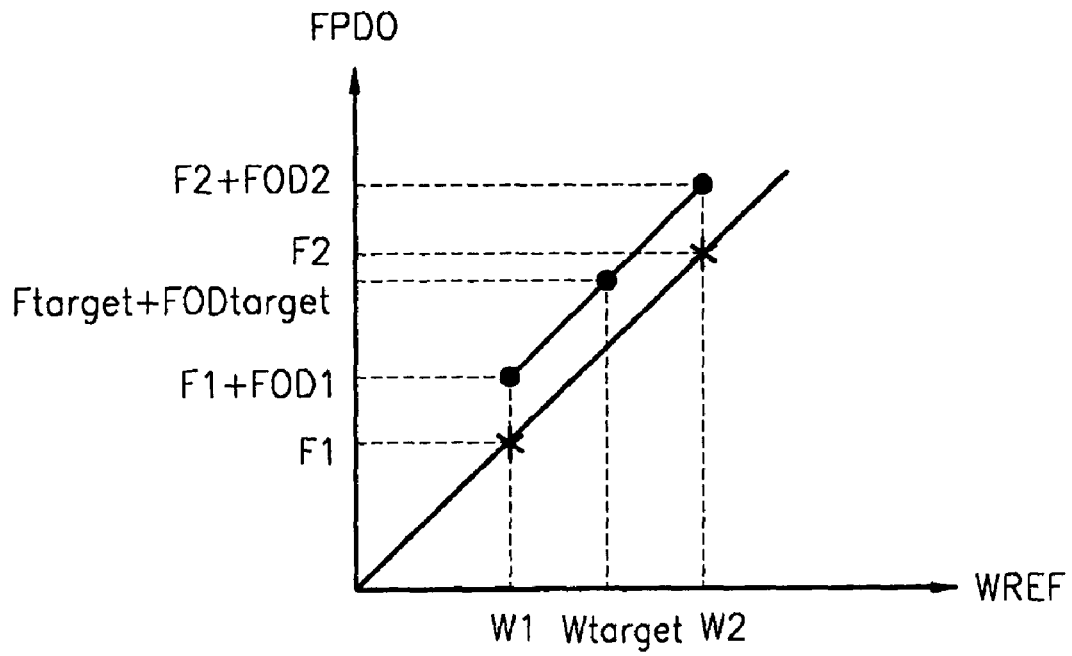

FIG. 6B is a graph illustrating operations of determining an FPDO value proportional to a corresponding overdrive power when an FPDO value proportional to a base power is determined. Since an overdrive ratio is set to a certain value depending on the disc type, FPDO values proportional to the overdrive power, i.e., FOD1, FODtarget, and FOD2, may be respectively obtained by multiplying F1, Ftarget, and F2 by each overdrive ratio.

Figure 6C:
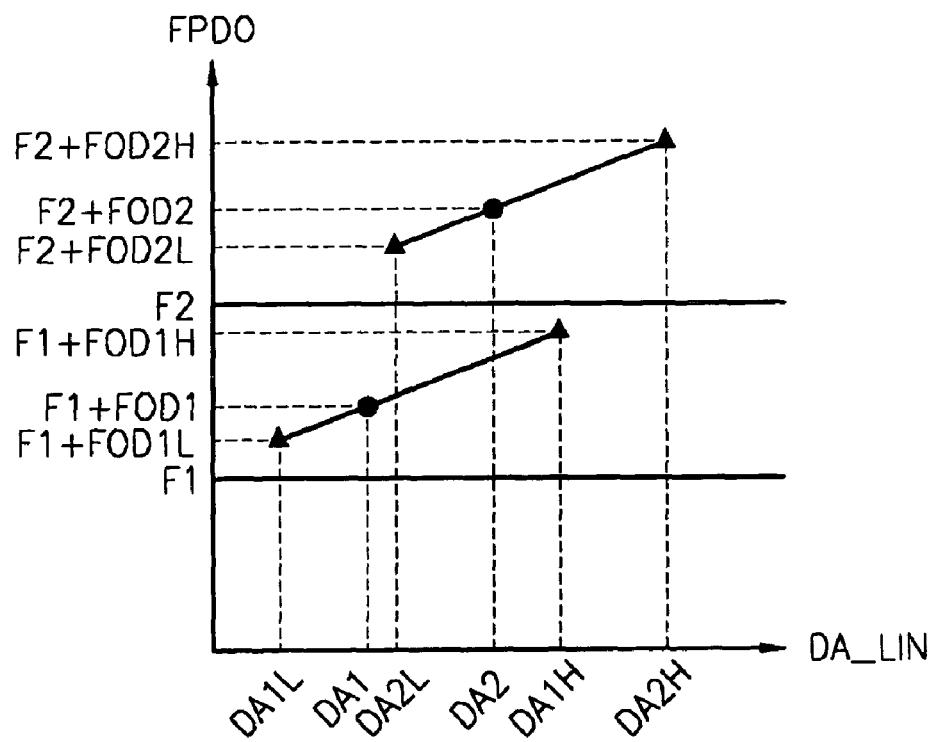

FIG. 6C is a graph illustrating an operation of determining a value of the overdrive power channel signal DA_LIN for outputting the FPDO value when the FPDO value proportional to the overdrive power is determined. In a state where WREF is applied to output the base power, predetermined values of the overdrive power channel signal, i.e., DA1L, DA1H, DA2L, and DA2H, are applied to measure respective FPDO values F1+FOD1L, F1+FOD1H, F2+FOD2L, and F2+FOD2H. If F1 or F2 is subtracted from the measured values, the resulting FPDO values are the same as those obtained when only the values of the overdrive power channel signal DA_LIN, i.e., DA1L, DA1H, DA2L, and DA2H, are applied. The central processing unit 160 stores pairs of input/output values of values of the overdrive power channel signal DA_LIN and FPDO values, i.e., (DA1L, FOD1L), (DA1H, FOD1H), (DA2L, FOD2L), and (DA2H, FOD2H), in the memory 170. Meanwhile, a plurality of input/output values of WREF and FPDO as shown in 6A are obtained so as to determine a more accurate linear function. Likewise, measuring more pairs of data allows the period to be divided into more periods and find functions for respective periods. As a result, the functions can be more accurate.

Figure 6D:
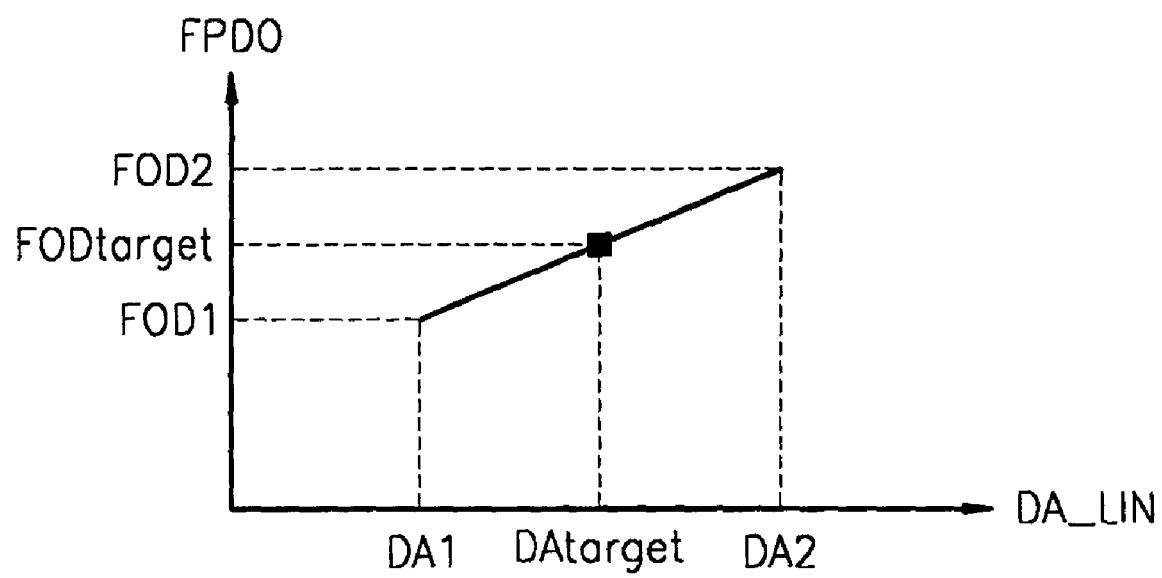

FIG. 6D is a graph illustrating operations of determining a value DAtarget of the overdrive power channel signal DA_LIN when the FPDO value FODtarget proportional to the required overdrive power is determined. As shown in FIG. 6C, the central processing unit 160 refers to two pairs of data among the pairs of input/output values of values of the overdrive power channel signal DA_LIN and FPDO values, i.e., (DA1L, FOD1L), (DA1H, FOD1H), (DA2L, FOD2L), and (DA2H, FOD2H) and thus determines the linear function as shown in FIG. 6D. An x-axis value DAtarget may be determined based on the corresponding already-obtained y-axis value FODtarget. The central processing unit 160 outputs the determined value DAtarget to the optical emission unit driving unit 120, thereby controlling the optical emission unit 130 to output the overdrive power capable of maintaining a constant overdrive ratio. Meanwhile, as described above, the central processing unit 160 obtains FPDO by applying DA_LIN in a state where WREF is already applied, and then subtracts FPDO resulting from only WREF so as to obtain FPDO resulting from only DA_LIN. This enables minimization of errors by measuring data under the same condition as operations of an actual recording device. However, even when FPDO is obtained by applying only DA_LIN in disregard of the same condition, it is possible to obtain the graph of FIG. 6D.

Hereinafter, an embodiment of the automatic power calibration method used by an optical recording device according to the present invention will be described with reference to the appended drawings.

Figure 7:
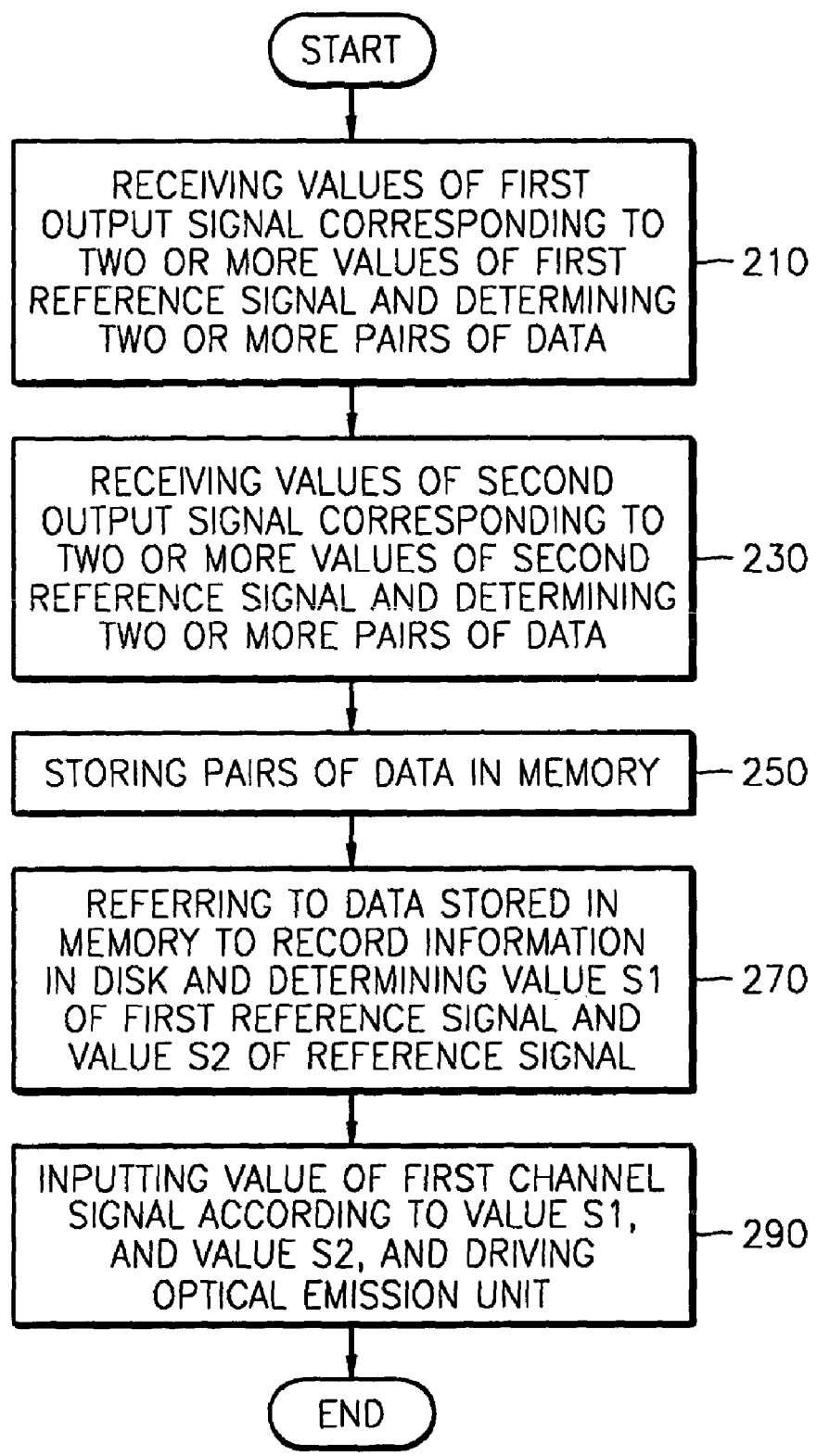
FIG. 7 is a flowchart illustrating a power calibration method performed in an automatic power calibration apparatus according to the embodiment of the present invention illustrated in FIG. 2.

FIG. 7 is a flowchart illustrating the power calibration method performed in the automatic power calibration apparatus of FIG. 2, according to the present invention.

The central processing unit 160 receives values of the first output signal FPDO corresponding to two or more values of the first reference signal WREF and determines two or more pairs of data (operation 210).

The central processing unit 160 receives values of the second output signal FPDO corresponding to two or more values of the second channel signal DA_LIN and determines two or more pairs of data (operation 230).

The pairs of data determined in operations 210 and 230 are stored in the memory 170 by the central processing unit 160 (operation 250).

The central processing unit 160 refers to the data stored in the memory to record information on the disc inserted in the optical recording device and determines a value S1 of the first reference signal WREF and a value S2 of the second reference signal DA_LIN (operation 270).

The central processing unit 160 outputs the value S1 of the first reference signal determined in operation 270 to the automatic power control unit 110. Then, the automatic power control unit 110 inputs the first channel signal VWDC according to the value S1 of the first reference signal as well as the value S2 of the second channel signal DA_LIN to the optical emission unit driving unit 120, thereby driving the optical emission unit driving unit 120 to output an optical power desired by the optical emission unit 130 (operation 290).

Figure 8:
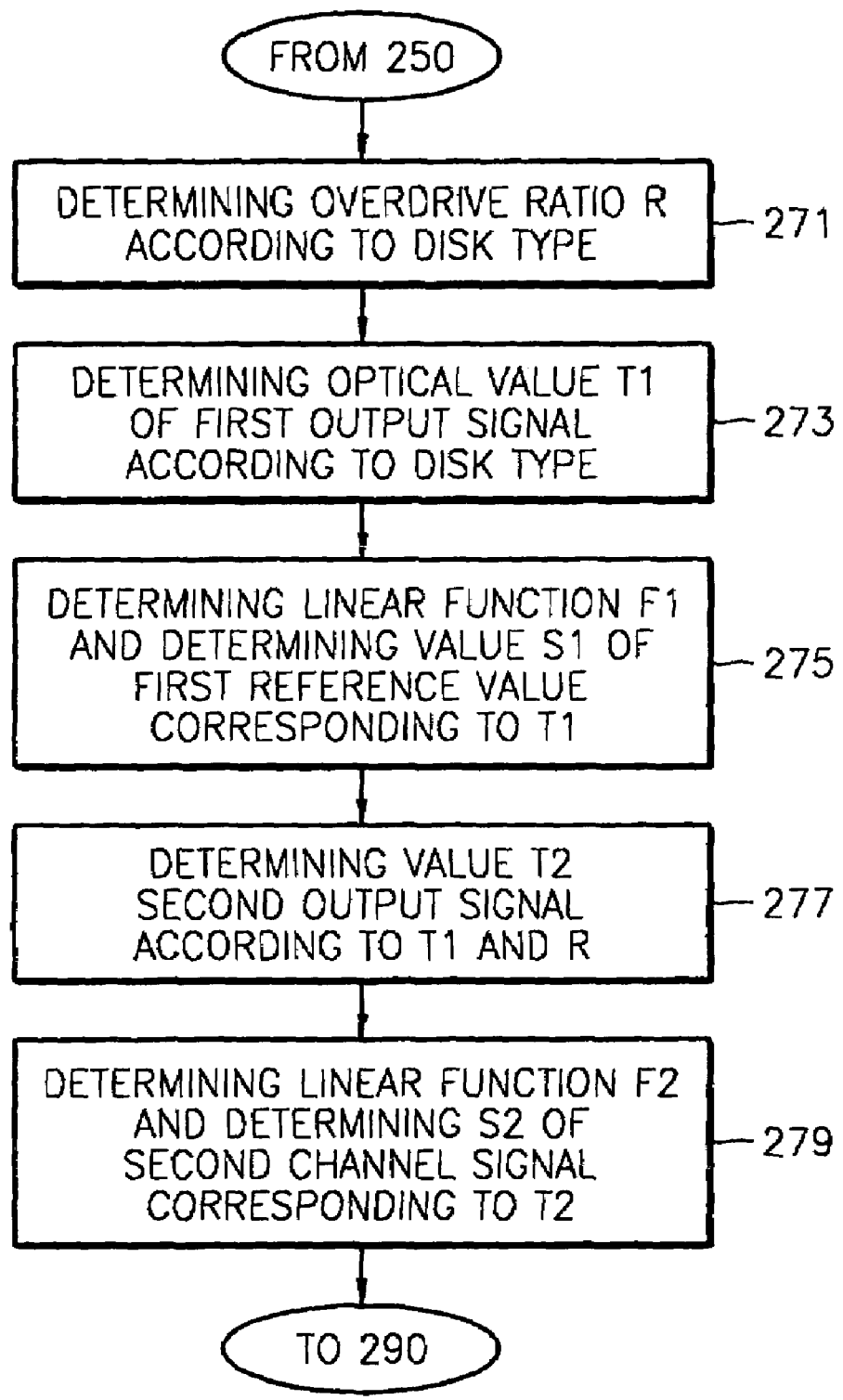
FIG. 8 is a flowchart illustrating operation 270 of FIG. 7 in detail.

FIG. 8 is a flowchart illustrating operation 270 of FIG. 7 in detail.

The central processing unit 160 determines a type of the disc inserted in the optical recording device for recording information by referring to the database 180 and thus determines an overdrive ratio R for a particular type (operation 271).

The central processing unit 160 refers to the database 180 and thus determines an optimum value T1 of the first output signal FPDO, which is an output of the optical detection unit 140 equivalent to the base power according to the disc type, by controlling the power to be optimum (operation 273). Optimum power control (OPC) is conducted to determine the optimum writing power before recording data on a recording medium. In more detail, data is recorded while varying the power of the light on a power calibration area provided at the innermost area of the recording medium. The power used to obtain the data having an optimum recording quality is determined as the writing power to be used during recording.

The central processing unit 160 determines a linear function F1 reflecting a relation between the value of the first reference signal and the first output signal value output from the optical detection unit 140 according to the first reference signal value. Then, according to the linear function F1, the value S1 of the first reference signal is determined to correspond to the optimum value T1 of the first output signal determined in operation 273 (operation 275).

The central processing unit 160 determines the value T2 of the second output signal, which is a value obtained by measuring the output of the optical emission unit 130 resulting from the value of the second channel signal DA_LIN by using the optical detection unit 140, according to the optimum value T1 of the first output signal and the overdrive ratio R determined in operation 271 (operation 277).

The central processing unit 160 determines a linear function F2 reflecting a relation between the second channel signal value and second output signal value according to the data stored in the memory 117, thereby determining the value S2 of the second channel signal corresponding to the value T2 of the second output signal (operation 279).

This invention may be embodied in a general purpose digital computer by running a program from a computer usable medium, including but not limited to storage media such as magnetic storage media (e.g., ROMs, floppy discs, hard discs, etc.), optically readable media (e.g., CD-ROMs, DVDs, etc.) and carrier waves (e.g., transmissions over the Internet). The computer readable recording medium can be dispersively installed in a computer system connected to a network, and stored and executed as a computer readable code in a distributed computing environment.

As set forth above, the automatic power calibration apparatus and method according to the present invention may accumulate basic data for power calibration by using outputs of the optical detection unit included in the optical recording devices. As it is unnecessary to use high-priced measuring apparatuses, costs may be reduced. Also, each optical recording device requires an adjusting time of only less than 4.5 seconds for accumulating the basis data during the power calibration, so as to improve productivity. Further, when information is recorded in a recording medium, an output characteristic of an optical emission unit may be uniformly maintained, thereby upgrading recording quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automatic power calibration method comprising:
   obtaining two or more pairs of first reference signal values, or values of reference signals of first channel signals, which are input to an optical emission unit driving unit, the optical emission unit driving unit driving an optical emission unit, and first output signal values obtained by measuring outputs of the optical emission unit resulting from the first channel signal values, using an optical detection unit;
   obtaining two or more pairs of second channel signal values, which are input to the optical emission unit driving unit, the optical emission unit driving unit driving the optical emission unit, and second output signal values obtained by measuring outputs of the optical emission unit resulting from the second channel signal values, using the optical detection unit;
   storing the pairs of signal values obtained in the obtaining the first reference signal values and the obtaining the second channel signal values;
   determining the first reference signal value S1 and the second channel signal value S2 from the stored signal values, so as to record information on a disc inserted in an optical recording device; and
   inputting in the optical emission unit driving unit the first channel signal value S1 and the second channel signal value S2 to drive the optical emission unit,
   wherein the obtaining two or more pairs of first and second channel signal values are operations obtaining the pairs of signal values within a period where a relation between the signal values exhibits a linear function, and
   wherein a read power channel signal is applied to the optical emission unit driving unit along with a write power channel signal and an overdrive power channel signal.

2. The method as claimed in claim 1, wherein the inputting in the optical emission unit driving unit comprises:
   determining a ratio R of the second output signal value to the first output signal value for a particular disc type;
   determining an optimum value T1 of the first output signal according to the disc type;
   determining a linear function F1 reflecting a relation between the first reference signal value and the first output signal value according to input/output signals obtained in the obtaining the pairs of first reference signal values, to determine the first reference signal value S1 corresponding to the optimum value T1 of the first output signal according to the linear function F1;
   determining the second output signal value T2 according to the optimum value T1 of the first output signal and the ratio R; and
   determining a linear function F2 reflecting a relation between the second channel signal value and the second output signal value according to the signal values obtained in the obtaining two or more pairs of second channel signal values, to determine the second channel signal value S2 corresponding to the second output signal value T2.

3. The method as claimed in claim 1, wherein the obtaining two or more pairs of second channel signal values comprises:
   inputting the second channel signal in a state where the first channel signal is already input to the optical emission unit driving unit; and
   determining as the second output signal value the value obtained by subtracting the first output signal value resulting from the first channel signal from the output signal value measured by the optical detection unit, to obtain two or more pairs of input/output values based on the determined second output signal value.

4. The method as claimed in claim 2, wherein:
   the obtaining two or more pairs of first and/or second channel signal values comprise obtaining three or more pairs of signal values to find two or more periods divided by the pairs of signal values; and
   the determining linear functions F1 and F2 comprises determining the linear functions F1 and F2 for respective periods and determining the value S1 of the first reference signal and/or the value S2 of the second channel signal.

5. An automatic power calibration apparatus for an automatic recording apparatus, the apparatus comprising:
   an optical emission unit;
   an optical emission unit driving unit outputting a signal driving the optical emission unit in response to two or more first channel signal values and/or two or more second channel signal values;
   an optical detection unit detecting two or more first output signal values and two or more second output signal values corresponding respectively to the first and second channel signals;
   a memory;
   a central processing unit receiving the first and second output signal values from the optical detection unit; and
   an automatic power control unit adjusting the first channel signal value to maintain the first output signal value equivalent to a first reference signal, according to the first reference signal, which is a reference signal of the first channel signal input from the central processing unit, and the first output signal input from the optical detection unit, and outputting the adjusted first channel signal value to the optical emission unit driving unit,
   wherein the central processing unit outputs the second channel signal to the optical emission unit driving unit to control the second output signal value, stores in the memory a pair of input/output values of the first reference signal value and the corresponding first output signal value as well as a pair of input/output values of the second channel signal value and the corresponding second output signal value, and refers to a linear function reflecting a relation between the pairs of input/output values stored in the memory and determines the first reference signal value S1 and the second channel signal value S2, so as to record information on an inserted disc, and wherein a read power channel signal is applied to the optical emission unit driving unit along with a write power channel signal and an overdrive power channel signal.

6. The apparatus as claimed in claim 5, further comprising a database unit storing data including a ratio of the second output signal value to the first output signal value, which varies from disc type to disc type, and an optimum first output signal value, wherein the central processing unit determines a ratio R of the second output signal value to the first output signal value for particular types of the inserted disc by referring to the database unit, determines an optimum value T1 of the first output signal value for the particular disc type, determines a linear function F1 reflecting a relation between the first reference signal value and the first output signal value according to the pairs of input/output values of the first reference signal value and the first output signal value stored in the memory to determine the first reference signal value S1 corresponding to the optimum value T1 of the first output signal, determines the second output signal value T2 according to the optimum value T1 of the first output signal and the ratio R, and determines a linear function F2 reflecting a relation between the second channel signal value and the second output signal value according to the pairs of input/output values of the second channel signal value and the second output signal value stored in the memory to determine the second channel signal value S2 corresponding to the second output signal value T2.

7. The apparatus as claimed in claim 5, wherein the optical emission unit driving unit receives the first and second channel signals together to drive the optical emission unit, and wherein the central processing unit determines as the second output signal value the value obtained by subtracting the first output signal value resulting from the first channel signal from the output signal value of the optical emission unit.

8. The apparatus as claimed in claim 5, further comprising an amplification unit receiving the output of the optical detection unit and outputting the received output to the central processing unit.

9. The method as claimed in claim 6, wherein the central processing unit finds two or more periods divided by the pairs of input/output values by obtaining three or more pairs of input/output values of the first channel signal values and the first output signals, and three or more pairs of input/output values of the second input signal values and the second output signals, and determines linear functions F1 and F2 for respective periods to determine the first input signal value S1 and/or the second input signal value S2.

10. The apparatus as claimed in claim 8, wherein the central processing unit outputs an offset erase control signal to the amplification unit to remove an offset existing in the amplification unit.

11. A tangible computer-readable medium encoded with operating instructions for implementing a method of controlling power in an optical device, wherein the method is performed by a computer, the method comprising:

inputting pairs of first and second channel signal values to an optical emission driver;

optically detecting first and second output signal values of an optical emission unit resulting from the inputted first and second channel signal values;

determining a first target reference signal value and a second target reference signal value of a first reference signal and a second reference signal from a linear relationship of the first and second channel signal values and the first and second output signal values; and adjusting the first and second reference values controlling the first and second channel signal values to the first and second target reference values, thereby maintaining the first and second output signal values at first and second optimal output signal values, wherein a read power channel signal is applied to the optical emission driver along with a write power channel signal and an overdrive power channel signal, and wherein the optical emission driver outputs a current to an optical emission unit and a power of light emitted from the optical emission unit is determined by a strength of the output current applied to the optical emission unit, and wherein the tangible computer-readable medium is not a carrier wave.

12. A method of controlling power in an optical device having an optical emission driver driving an optical emission unit, comprising:

inputting a pair of first channel signal values and a pair of second channel signal values to the optical emission driver;

optically detecting first output signal values and second output signal values from the optical emission unit resulting from the pairs of first channel signal values and second channel signal values;

determining a first target reference value of a first reference signal and a second target reference value of a second reference signal based on a linear relationship of the first and second channel signal values and the first and second output signal values; and adjusting the first and second reference signal values to the first and second target reference values, thereby maintaining the first and second output signal values at optimal signal levels, wherein a read power channel signal is applied to the optical emission driver along with a write power channel signal and an overdrive power channel signal.

13. An apparatus controlling optical recording power, comprising:

an optical emission driver producing a driving signal from first and second channel signals;

an optical emission unit receiving the driving signal to produce an output signal;

an optical detection unit detecting the output signal;

a central processing unit outputting first and second reference signals;

a power control unit adjusting the first and second channel signals to maintain the output signal at an optimal level by comparing the first and second reference signals to the detected output signal, and the central processing unit further outputs an overdrive signal directly inputted to the optical emission driver such that the first and second reference signals comprise signals generated by a closed loop and the overdrive signal comprises a signal generated by an open loop, wherein the optical emission driver produces the driving signal by adding together currents corresponding to the first and second reference signals and the overdrive signal.

* * * * *